United States Patent [19]

Ishii et al.

[11] Patent Number: 4,544,612

[45] Date of Patent: Oct. 1, 1985

[54] IRON OXIDE MAGNETIC FILM AND PROCESS FOR FABRICATION THEREOF

[75] Inventors: Osamu Ishii; Fumikatsu Yoshimura; Iwao Hatakeyama, all of Mito, Japan

[73] Assignee: Nippon Telegraph & Telephone Public Corporation, Tokyo, Japan

[21] Appl. No.: 532,978

[22] Filed: Sep. 16, 1983

[30] Foreign Application Priority Data

Sep. 22, 1982 [JP] Japan ............................... 57-164134
Jul. 15, 1983 [JP] Japan ............................... 58-127786

[51] Int. Cl.[4] ............................................. B32B 15/18

[52] U.S. Cl. .................................... 428/692; 428/702; 428/900; 252/62.56

[58] Field of Search ............... 428/692, 693, 694, 695, 428/403, 900, 702; 427/130, 132; 252/62.56; 423/634

[56] References Cited

U.S. PATENT DOCUMENTS

| | | | |
|---|---|---|---|
| 3,903,004 | 9/1975 | Matsumoto et al. | 252/62.56 |
| 4,069,367 | 1/1978 | Umeki et al. | 252/62.56 |
| 4,082,905 | 4/1978 | Stephan et al. | 252/62.56 |
| 4,156,037 | 5/1979 | Hattori et al. | 427/130 |
| 4,170,689 | 10/1979 | Katsui et al. | 427/130 |
| 4,202,932 | 5/1980 | Chen et al. | 427/128 |
| 4,215,158 | 7/1980 | Hattori et al. | 427/130 |
| 4,232,061 | 11/1980 | Hattori et al. | 427/130 |
| 4,232,071 | 11/1980 | Terada et al. | 427/130 |
| 4,409,281 | 10/1983 | Kitamoto et al. | 428/695 |
| 4,416,943 | 11/1983 | Saito | 428/333 |
| 4,438,066 | 3/1984 | Aboaf et al. | 360/135 |
| 4,490,268 | 12/1984 | Tcherner | 252/62.56 |

*Primary Examiner*—George F. Lesmes
*Assistant Examiner*—William M. Atkinson
*Attorney, Agent, or Firm*—Oblon, Fisher, Spivak, McClelland & Maier

[57] ABSTRACT

$\gamma$-$Fe_2O_3$ film with at least one additive selected from the group consisting of Pd, Au, Pt, Rh, Ag, Ru, Ir, and Os, especially Os are disclosed. Reduction from $\alpha$-$Fe_2O_3$ to $Fe_3O_4$ is accelerated by additive Os to achieve a uniform reduction and increase the ratio of magnetic phase in the film. $\gamma$-$Fe_2O_3$ film medium with Os improved saturation magnetization and increased coercive force in proportion to amount of additive Os. Application of an external field to said film introduces magnetic anisotropy into said film, therefore said film medium improves coercive force and squareness of hysteresis loop by the introduction of anisotropy. $\gamma$-$Fe_2O_3$ crystal grain is prepared by additive Os to obtain fine grain. The resultant $\gamma$-$Fe_2O_3$ film medium a decreased noise level.

8 Claims, 11 Drawing Figures

IRON OXIDE MAGNETIC FILM AND PROCESS FOR FABRICATION THEREOF

FIELD OF THE INVENTION

The present invention relates to iron oxide magnetic films to which are added noble metals, especially $\gamma$-$Fe_2O_3$ films with at least one noble metal additive selected from the group consisting of Pd, Au, Pt, Ru, Ag, Rh, Ir, Os and the process for fabrication thereof.

BACKGROUND OF THE INVENTION

For some time it has been desired to decrease recording medium thickness and improve the coercive force to operate at high density recording levels. Conventionally, $\gamma$-$Fe_2O_3$ fine particles are generally coated with binder on a substrate to form a $\gamma$-$Fe_2O_3$ coated medium, thereafter the coated $\gamma$-$Fe_2O_3$ is hardened to form a $\gamma$-$Fe_2O_3$ disk medium. Alternatively, a $\gamma$-$Fe_2O_3$ film is prepared by reactive sputtering from an iron target onto the substrate and the resultant $\alpha$-$Fe_2O_3$ film is reduced by heating in $H_2$ gas to form a $Fe_3O_4$ film and the resultant $Fe_3O_4$ film is oxidized by heating in air to form the desired $\gamma$-$Fe_2O_3$ film. Thus resultant $\gamma$-$Fe_2O_3$ films have been developed as magnetic disk media (J. Appl. phys. VOL. 53 No. 3 1982. page 2556 to 2560). To the $\gamma$-$Fe_2O_3$ film Co is added to increase the coercive force (Hc) (IEEE, Trans. Mag. VOL.MAG-15 1979 page 1549 to 1551).

Cu may also be added to $\gamma$-$Fe_2O_3$ film to extend the lower limit of reduction temperature. As a substrate for the magnetic disk used in this method, a Al-alloy plate polished and coated with an anodized layer (alumite) may be used. When this substrate is heated over 320° C., the surface of Al-substrate is caused to roughen and the coated $Al_2O_3$ layer is cracked. Therefore, the process of reduction from $\alpha$-$Fe_2O_3$ to $Fe_3O_4$ is a critical process in the fabrication of $\gamma Fe_2O_3$ film. It is necessary that the lower limit of reduction temperature is extended toward the lower temperature side in order to fabricate uniform $\gamma$-$Fe_2O_3$ film medium having excellent magnetic and mechanical properties on the substrate.

To $\gamma$-$Fe_2O_3$ film Ti may be added to improve the squareness of hysteresis loop. $\gamma$-$Fe_2O_3$ films to which have been added Co, Ti, and Cu thus show improvement of the coercive force and the effect of extending the lower limit of reduction temperature. However, it is known that $\gamma$-$Fe_2O_3$ film having the above-mentioned metals have a lower saturation magnetization ($4\pi$ Ms). It is believed that these metal ions cause a lowering of the magnetic moment, these metal ions also influence the amorphous non-magnetic phase and the lattice defect obtained in sputtering film. Additionally the resultant films are porous.

Co as an additive is effective to increase the coercive force in fabrication of $\gamma$-$Fe_2O_3$ film but causes reduction of the saturation magnetization and causes further deterioration of the squareness of hysteresis loop. Therefore, a recording medium having higher saturation magnetization is required in the fabrication of $\gamma$-$Fe_2O_3$ film disk.

One of the objects of the application of $\gamma$-$Fe_2O_3$ film medium is as a magnetic recording disk. The maximum value (Hs) of the horizontal component produced from a magnetic disk head can be calculated according to Karlqvist's equation (M. MATSUMOTO "Magnetic recording" Kyoritsu Shuppan Kabushiki Kaisha page 21 (1977)).

$$Hs-4\ Ms\ \cot^{-1}(2y/g)$$

herein

Ms: Saturation magnetization of head material y: head-medium spacing g: head gap length When using ferrite, as many head materials have, a saturation magnetization 400 Gauss, head gap of 0.8 $\mu$m and head medium spacing 0.2 $\mu$m and medium thickness 0.1 $\mu$m in magnetic recording, the horizontal component (Hs) reached can be calculated as about 1500 Oe. If Hx of the hysteresis loop of the magnetic film shown in FIG. 1 is more than 1500 Oe, this medium does not saturate under the above mentioned recording conditions, resulting in the so-called unsaturation recording. This situation causes poor overwrite and erase characteristics.

There is a relation in $\gamma$-$Fe_2O_3$ film, $Hx=\alpha Hc$, herein $\alpha$ is 1.8 to 2.0 in $\gamma$-$Fe_2O_3$ film. When the coercive force has a value more than about 800 Oe in the recording condition, $Hx\geqq 1500$ Oe. This value becomes larger than above-mentioned Hs value. When the coercive force increases to realize high recording density, it is necessary to maintain $\alpha$ as low as possible. Ideally $\alpha=1$. On the other hand, coercive squareness S,*, showing the slope at point of coercive force of hysteresis loop, has the relationship $S^*=Hr/Hc$. $S^*$ value influences the recording density in saturation magnetization recording.

When the magnetic field distribution caused from the head is constant and $S^*$ becomes larger, recording density increases due to the narrowing width, a, in the magnetization transition region in the medium. To $\gamma$-$Fe_2O_3$ film usually are added several atom % of Ti and Cu to improve $S^*$ of disk media. $\gamma$-$Fe_2O_3$ films having $S^*=0.77$ is used in practice as magnetic recording disk media.

The relation between width a of the transition region and recording medium characteristics such as film thickness d, residual magnetization Mr, coercive force Hc, and $S^*$ have been investigated and analyzed by Talke et al (IBM. J. Res. Develop 19 page 591 to 596 (1975)). The relation between the width a of transition region and recording density $D_{50}$ have been investigated by Comstock (IBM. J. Res. Develop 18 page 556 to 562 (1974)), herein recording density $D_{50}$ is the recording density where the output attenuated to half of the isolated output.

Based on the above-mentioned equation, the dependence of recording density $D_{50}$ on Hc or $S^*$ can be calculated. When $S^*$ increases about 0.1, recording density $D_{50}$ increases about 100 FRPM (Flux Reversal per millimeter). When Hc increases 100 Oe, $D_{50}$ increases about 100 FRPM. This is calculated given 0.12 $\mu$m in thickness d, 240 Gauss in residual magnetization, 0.15 $\mu$m in head gap length, 0.1 $\mu$m in head flying height, 700 to 1000 Oe in Hc and 0.60 to 0.95 in $S^*$. The improvement $D_{50}$ means the increase of read back output in high recording density. If the noise voltage produced from the disk medium is kept constant, it is obvious that improvement of the signal to noise ratio is carried in disk medium.

SUMMARY OF THE INVENTION

An object of the present invention is to provide $\gamma$-$Fe_2O_3$ film containing at least one noble metal element selected from the group consisting of Pd, Au, Pt, Rh, Ag, Ru, Ir and Os.

Another object of the present invention is to provide the process for fabrication of iron oxide magnetic films having an excellent squareness of hysteresis loop and saturation magnetization.

According to the present invention, $\gamma$-$Fe_2O_3$ film is fabricated on a substrate by sputtering consisting essentially of at least one selected from the group consisting of Pd, Au, Pt, Rh, Ag, Ru, Ir, Os as an additive. An iron alloy target, to which is added the above-mentioned noble element, is sputtered by reactive sputtering on the substrate to form $\alpha$-$Fe_2O_3$ film containing the additive. The $\alpha$-$Fe_2O_3$ film then is heated in wet hydrogen gas to form a $Fe_3O_4$ film containing the additive. The $Fe_3O_4$ film then is heated in air to form a $\gamma$-$Fe_2O_3$ film containing the additive.

According to another embodiment of the present invention, a $\gamma$-$Fe_2O_3$ film to which is added Os is reduced to form $Fe_3O_4$ film. A magnetic field is applied to the $Fe_3O_4$ films containing Os before or after oxidation, or during oxidation in air.

The resultant $\gamma$-$Fe_2O_3$ films have excellent magnetic characteristics for use as a magnetic medium.

The present invention has the following advantages:

1. The sputtered film with noble metal element additive which has lesser ionization tendency than iron, can be easily reduced to the $Fe_3O_4$ phase.

2. Ratio of magnetic phase ($Fe_3O_4$ phase) occupied in the resultant film increases consequently due to an accelerated reduction process and successively $Fe_3O_4$ film is oxidized in air to form $\gamma$-$Fe_2O_3$. The resultant $\gamma$-$Fe_2O_3$ films have an improved saturation magnetization.

3. Coercive force of $\gamma$-$Fe_2O_3$ film increases in proportion Os element content.

4. Oxidation from $Fe_3O_4$ to $\gamma$-$Fe_2O_3$ to which Os is added may be carried out with application of magnetic fields to introduce induced magnetic anisotropy in the film, the heated films having induced magnetic anisotropy. $\gamma$-$Fe_2O_3$ and $Fe_3O_4$ then give magnetic anisotropy, improving coercive force and squareness of hysteresis loop.

5. In the process for fabrication according to the present invention, $\gamma$-$Fe_2O_3$ crystal particles are formed in micrograin dimension, therefore the resultant $\gamma$-$Fe_2O_3$ film medium can decrease the noise.

DETAILED DESCRIPTION OF THE PREFERRED EMBODIMENTS

Figure 1:
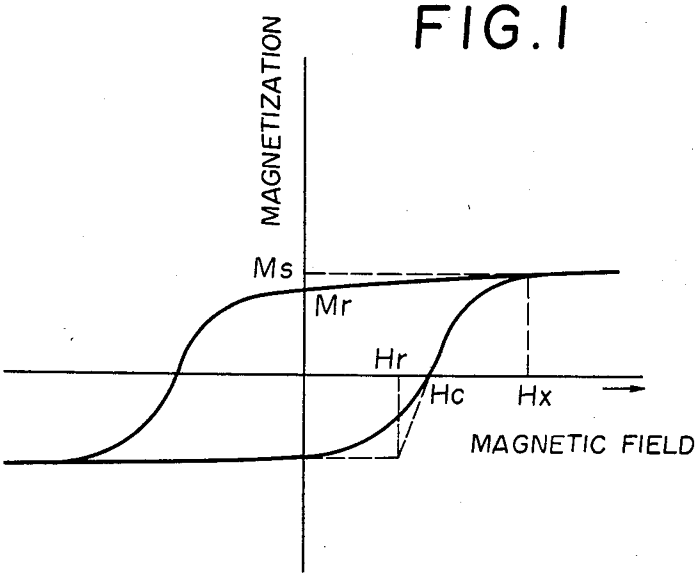
FIG. 1 shows a graph of a typical hysteresis loop of magnetic film.
Figure 2:
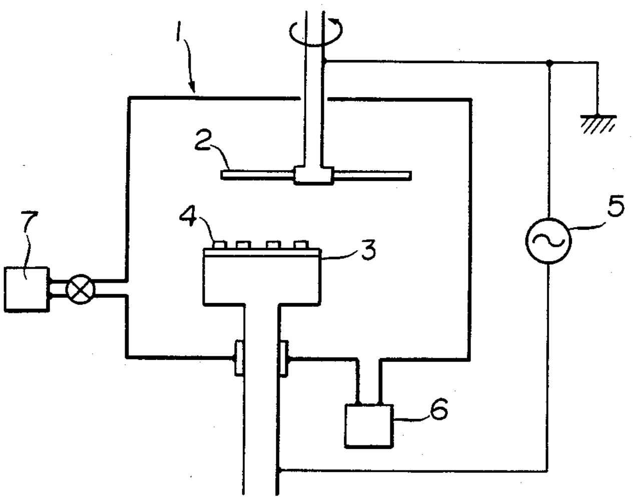
FIG. 2 shows a schematic sputtering apparatus for fabrication of iron oxide magnetic film.

Iron oxide magnetic films of the present invention are prepared by the sputtering appartus showed in FIG. 2. A method of preparation using Au as the additive is as follows. Target 3 is provided in vacuum chamber 1 and provided 98 at. % Fe - 2 at. % Co alloy plate 200 mm in diameter and additive pellets 4 having 5 mm in width ×5 mm in length ×0.5 mm in thickness are placed on the target 3. Additive content can be controlled by increasing or decreasing the number of additive pellets 4 placed on the target 3. A substrate 2 having 210 mm in diameter is provided to opposite the target 3 in vacuum chamber 1. The substrate 2 can be rotated axially and can comprise an Al alloy disk coated with anodized oxide layer (alumite). The vacuum chamber 1 is evacuated by vacuum pump 6, 50% Ar+50% $O_2$ gas mixture from gas guide system 7 is introduced into the chamber to provide the sputtering atmosphere of $3\times10^{-3}$ Torr. A $\alpha$-$Fe_2O_3$ film having 0.14 $\mu$m in thickness is prepared by radio frequency magnetron sputtering applying 0.3 kW of sputtering power between the substrate 2 and the target 3. Additives that can be used include at least one selected from the group consisting of Pd, Pt, Rh, Ag, Ru, Ir, Os in the place of Au. Fe-alloy substrate, including the above-mentioned metals can be used of instead of the additive pellet 4. For comparison Co, Ti and Cu additive films are similarly prepared.

$\alpha$-$Fe_2O_3$ formed by reactive sputtering on the substrate is reduced in wet $H_2$ gas to 100 at 350° C. for 3 hours to form $Fe_2O_3$ film. The resultant films are examined by electron diffraction, magnetic measurement and Mossbauer effect measurement on the structure to determine whether it comprises $Fe_3O_4$ or not. $Fe_3O_4$ film is oxidized by heating at 300° C. for 3 hours in air to form $\gamma$-$Fe_2O_3$ film. Structure of the $\gamma$-$Fe_2O_3$ film is examined by electron diffraction and Mossbauer effect measurement.

The present invention may be further understood by way of the EXAMPLES as follows.

EXAMPLE 1

Figure 3:
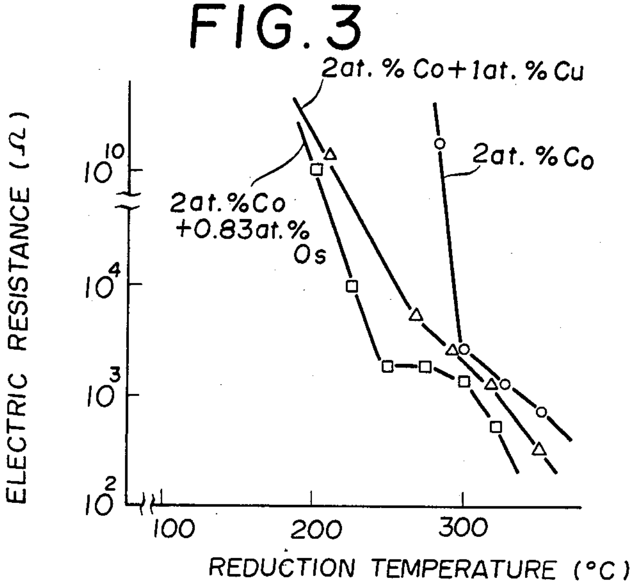
FIG. 3 shows a relation of reduction temperature and electric resistance.

A 2 at. % Co - 98 at. % Fe alloy plate having 200 mm in diameter, 2 at. % Co - 98 at. % Fe alloy with Cu pellets as additive, and 2 at. % Co - 98 at. % Fe alloy with Os pellets as additive are sputtered by reactive sputtering under $3\times10^{-3}$ Torr of 50% Ar+50% $O_2$ gas mixture at 0.3 kW of radio frequency sputtering power on an Al alloy substrate coated with anodized oxide rotated during the sputtering to form $\alpha$-$Fe_2O_3$ film having 0.14 $\mu$m in thickness. In this case, the additive metal elements in $\alpha$-$Fe_2O_3$ film were analysed 0.83 at. % of Os and 1.0 at. % of Cu. The resultant $\alpha$-$Fe_2O_3$ film was reduced in wet $H_2$ gas at 200° to 350° C. for 3 hours to form $Fe_3O_4$ film. Relation of reduction temperature and electric resistance is shown in FIG. 3. Electrical resistance was measured by the two point probe method, terminals spaced 5 mm apart. The reduced film exhibited $10^3$ to $10^4$ $\Omega$ of electric resistance and consisted of $Fe_3O_4$. The higher resistance of reduced film was confirmed to be due to a mixture of α-$Fe_2O_3$ and $Fe_3O_4$.

α-$Fe_2O_3$ film adding only 2 at. % of Co was reduced at 300° to 325° C., but α-$Fe_2O_3$ film with 1 at. % of Cu added was reduced at 260° to 320° C., lowering the lower limit of reduction temperature. Furthermore, α-$Fe_2O_3$ film to which was added 0.83 at. % of Os was reduced at 225° C. and in this case the accelerative effect of reduction from α-$Fe_2O_3$ to $Fe_3O_4$ was confirmed to proceed by a lesser amount of additive Os than additive Cu. When Os content exceeded 5 at. %, the resultant γ-$Fe_2O_3$ film did not exhibit improved saturation magnetization and squareness of hysteresis loop. When Os content was below 0.37 at. %, the resultant γ-$Fe_2O_3$ film did not exhibit improved magnetic properties and did not widen toward the lower temperature side the lower limit of reduction temperature. Therefore, it is determined that Os content should be 0.37 to 5 at. %.

EXAMPLE 2

γ-$Fe_2O_3$ film with at least one selected from the group consisting of Pd, Au, Pt, Rh, Ag, Ru, Ir, Os as additive was prepared by reactive sputtering using 2 at. Co - 98 at. %. Fe alloy target under $8\times10^{-3}$ Torr of 50% Ar - 50% $O_2$ gas mixture at 1 kW of radio frequency sputtering power on the Al alloy substrate. The conditions of sputtering and heat treatment were the same showed in EXAMPLE 1. Relation of saturation magnetization and additive element and content (at. %) is shown in TABLE 1.

TABLE 1

| Additive metal element | Content (at. %) | Saturation magnetization of γ-$Fe_2O_3$ film (Gauss) |
|---|---|---|
| Ag | 1.5 | 3600 |
| Au | 1.8 | 3700 |
| Pd | 3.0 | 3400 |
| Pt | 2.3 | 3700 |
| Rh | 1.7 | 3400 |
| Ir | 1.8 | 3500 |
| Ru | 2.1 | 3500 |
| Os | 0.5 | 3500 |
| Os | 0.83 | 3550 |
| Os | 2.13 | 3500 |

All resultant γ-$Fe_2O_3$ film had over 3400 Gauss of high saturation magnetization.

These values of saturation magnetization are higher by about 100 Gauss in comparison with γ-$Fe_2O_3$ films having Co and Cu, or Co, Cu and Ti which exhibit about 3300 Gauss, as reported in prior art. All resultant $Fe_3O_4$ film containing the additives of TABLE 1 had a lower limit of reduction temperature less than 225° C., which could not be achieved by using Cu additive at the same content.

Os is especially preferred as an additive as it not only increased the saturation magnetization, but increased the coercive force. Coercive force of γ-$Fe_2O_3$ film obtained from 2 at. % Co - 98 at. % Fe in the prior art was 650 Oe, but in the case of 0.5 at. % Os it was 900 Oe, in the case of 0.83 at. % Os it was 1100 Oe and in the case of 2.13 at. % Os it was 1800 Oe.

EXAMPLE 3

Figure 4:
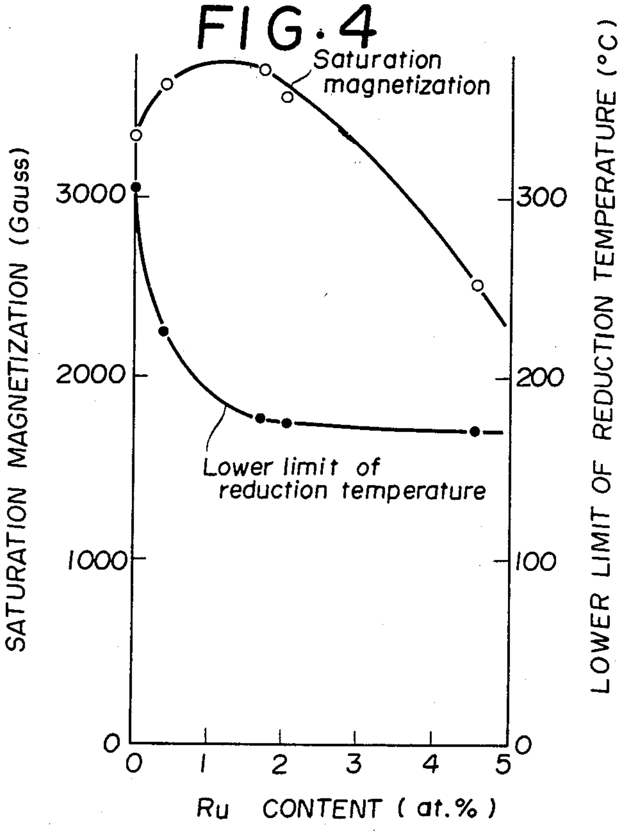
FIG. 4 shows a relation of Ru content and lower limit of reduction temperature and saturation magnetization.

98 at. % Fe- 2 at. % Co target was sputtered by radio frequency sputtering under $8\times10^{-3}$ Torr of 50% Ar+50% $O_2$ gas mixture at 1 kW of sputtering power using additive Ru from 0.4 to 4.6 at. % to form α-$Fe_2O_3$ film with Ru on the substrate. The resultant α-$Fe_2O_3$ film was reduced in wet $H_2$ gas by heating to form $Fe_3O_4$ film then was oxidized by heating in air to form γ-$Fe_2O_3$ film. Relation of Ru content and saturation magnetization is shown in FIG. 4. When Ru content was below 3 at. %, the resultant film obtained had a higher saturation magnetization than that of the γ-$Fe_2O_3$ film containing no Ru, but when Ru content exceeded 4.5 at. %, the resultant film exhibited decrease of saturation magnetization.

Lower limit of reduction temperature is also shown in FIG. 4. When Cu content was increased in α-$Fe_2O_3$ film, the lower limit of reduction temperature did not decrease below 210 to 225° C. However, when Ru content exceeded 0.4 at. %, lower limit of reduction temperature could be decreased to less than 225° C. Therefore, it is determined that Ru content should be 0.4 to 4.5 at. %.

When Pt content exceeded 3 at. % in γ-$Fe_2O_3$ films no improvement in the saturation magnetization was observed. When Pt content was below 0.5 at. %, the resultant γ-$Fe_2O_3$ film did not exhibit improved magnetic properties. Therefore, it is determined that Pt content should be 0.5 to 3 at. %.

When Ag, Rh, and Ir content exceeded 2 at. %, the resultant γ-$Fe_2O_3$ film showed no improvement in the saturation magnetization. When Ag, Rh, and Ir content were below 0.5 at. %, the resultant γ-$Fe_2O_3$ film did not have improved magnetic properties. Therefore, it is determined that Ag, Rh and Ir content should be 0.5 to 2 at. %.

EXAMPLE 4

γ-$Fe_2O_3$ films were prepared using iron target containing 2 at. % Co and 2 at. % of Ti and maximum 3.4 at. % of Au by reactive sputtering under the same conditions in EXAMPLE 1. When Au content exceeded 3 at. %, the resultant γ-$Fe_2O_3$ film did not have improved saturation magnetization. When Au content was below 0.5 at. %, the resultant γ-$Fe_2O_3$ film did not show improved magnetic properties. The lower limit of reduction temperature was from 175° to 180° C. in the case of additive Au. Therefore, it is determined that Au content should be 0.5 to 3 at. %.

EXAMPLE 5

γ-$Fe_2O_3$ film was prepared by radio frequency sputtering using the α-$Fe_2O_3$ sintered target containing $Co_2O_3$, $TiO_2$, and $RuO_2$ (2.5, 2.0, 1.0 and 0.5 mol % respectively) and reducing and oxidizing with the same conditions shown in EXAMPLE 1. Ru content was confirmed by the chemical analysis and the γ-$Fe_2O_3$ film had 0.5 at. % of Ru. This film also had a lower limit of reduction temperature of 200° C. and 3500 Gauss saturation magnetization. When pure Ar gas was used for sputtering atmosphere with the same conditions of EXAMPLE 1, the resultant γ-$Fe_2O_3$ film had 3500 Gauss of saturation magnetization.

EXAMPLE 6

γ-$Fe_2O_3$ films containing 2 at. % of Co and Ru were prepared by reactive sputtering with the same conditions shown in EXAMPLE 1. When Ru content was 0.5 at. %, the reduction temperature from α-$Fe_2O_3$ to $Fe_3O_4$ ranged from 200° to 270° C. The resulting γ-$Fe_2O_3$ film showed suitable features as high recording density medium such as 700 Oe coercive force, and 0.8 squareness ratio.

A magnetic disk of γ-$Fe_2O_3$ film containing 0.5 at. % Ru was investigated as to wear resistance of the disk surface in comparison with that of a γ-$Fe_2O_3$ film disk containing 2 at. % Co, 2 at. % Ti, and 1.5 at. % Cu. Wear resistance of the disks was measured by pressing Mn-Zn ferrite balls 3 mm in diameter on the disk surface rotating at 1 m/sec relative velocity and thereafter the disk was rotated 1000 times. Wear depth then was measured to evaluate wear resistance.

Wear resistance of γ-$Fe_2O_3$ film having Co and Ru improved to decrease about one figure of wear depth under the same load in comparison with that of γ-$Fe_2O_3$ film with Co, Ti and Cu added. The improvement of wear resistance for the disk was effective to prevent head crash events, the type of hard disk in which the action of the flying head was under the contact-stop-start (CSS) mode.

EXAMPLE 7

γ-$Fe_2O_3$ film with Ru and Au were prepared using 98 at. % Fe - 2 at. % Co alloy as target by reactive sputtering with the same condition showed in EXAMPLE 1. As additives 0.7 at. % of Ru and 0.3 at. % of Au were added into above-mentioned Fe-Co alloy target and sputtered to form α-$Fe_2O_3$ film and α-$Fe_2O_3$ reduced in wet $H_2$ gas to form $Fe_3O_4$ film. The reduction temperature ranged from 175° to 275° C. The resultant γ-$Fe_2O_3$ film then showed 4000 Gauss of saturation magnetization.

Figure 5:
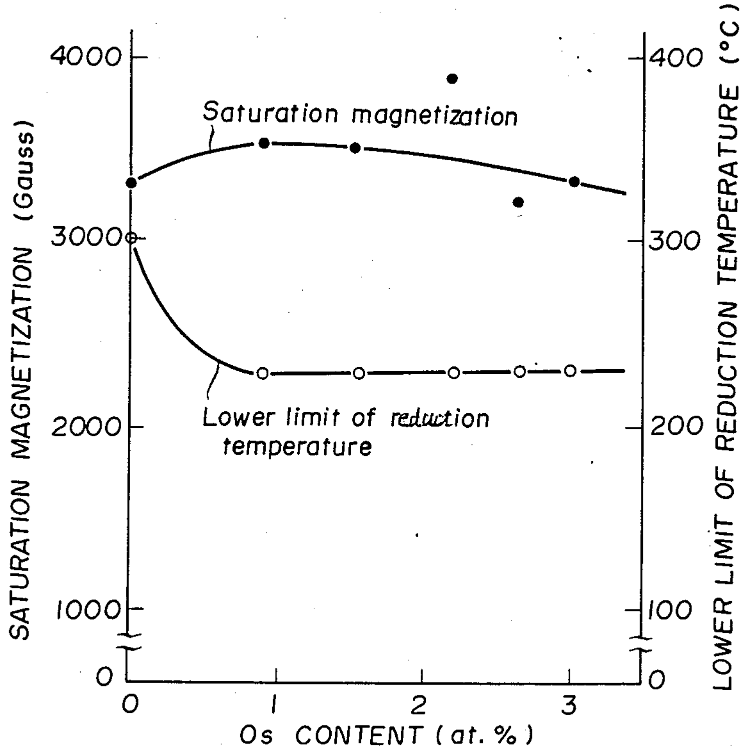
FIG. 5 shows a relation of Os content and lower limit of reduction temperature and saturation magnetization.
Figure 6:
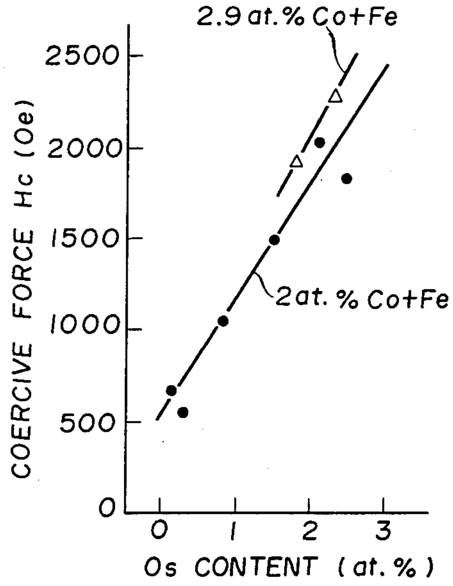
FIG. 6 shows a relation of Os content and coercive force.

EXAMPLE 8

γ-$Fe_2O_3$ films were prepared by reactive sputtering under $8\times10^{-3}$ Torr of 50% Ar+50% $O_2$ gas mixture at 200 W of sputtering power using 98 at. % Fe - 2 at. % Co alloy as the target. The target had 100 mm in diameter. Os powder was placed on the target. This sputtering method was applied to direct current magnetron method. The substrate using Al-alloy disk coated with anodized film (alumite) had 210 mm in diameter and was rotated at 10 r.p.m. during the formation of sputtering film to obtain uniform films. Deposited α-$Fe_2O_3$ film having 0.17 μm in thickness was prepared by reactive sputtering for 55 minutes. Content of Os can be controlled with Os powder placed on the target. The resultant α-$Fe_2O_3$ film had maximum 5 at. % of Os.

α-$Fe_2O_3$ film added Os was reduced in wet $H_2$ gas at 200° to 350° C. for 3 hours to form $Fe_3O_4$ film. Relation of Os content and the lower limit of reduction temperature and the saturation magnetization was shown in FIG. 5. The lower limit of reduction temperature decreased with the increase of Os content. When Os content was 0.37 at. the reduction temperature was lowered to 250° C. When Os content exceeded 0.37 at. %, the reduction temperature from α-$Fe_2O_3$ to $Fe_3O_4$ was reached at 225° C. and thereafter kept a constant value. When Os content was 1 to 2 at. %, the resultant γ-$Fe_2O_3$ film had maximum 3500 Gauss saturation magnetization. When Os content exceeded 5 at. the resultant γ-$Fe_2O_3$ film did not have high saturation magnetization. Therefore, it is determined that Os content should be 0.37 to 5 at. %. It was believed that the effect of acceleration for the reduction reaction by adding Os was brought by catalytic action due to an ionization tendency of Os being less than that of iron. Relation of Os content and coercive force of γ-$Fe_2O_3$ film was shown in FIG. 6. The composition of the target was 98 at. % Fe - 2 at. % Co and 97.1 at. % Fe - 2.9 at. % Co alloy. The pellet and powder of Os was placed on the target. γ-$Fe_2O_3$ film was prepared by reactive sputtering with the same condition. Coercive force proportioned to Os content and Co content and maximum of coercive force was about 2380 Oe. Relation of Os content and Co content and coercive force can be shown as follows.

$$Hc \propto 650\times[Os]+170\times[Co]$$

wherein

[Os]: Os content at. %

[Co]: Co content at. %

Only Co was known to improve coercive force in prior art. When Co content was 10 at. %, the resultant γ-$Fe_2O_3$ film had 2000 Oe coercive force.

Very high coercive force therefore was obtained by the simultaneous composite addition of Co and Os. Next α-$Fe_2O_3$ film having 0.88 at. % Os was prepared by reactive sputtering using 99.9% Fe as target with the same condition and the resultant γ-Fe $_2O_3$ film was reduced in wet $H_2$ gas at 240° C. for 3 hours to form $Fe_3O_4$ film. The resultant $Fe_3O_4$ film formed on the substrate disk was separated to cut a piece of 8 mm×8 mm square. Pieces of $Fe_3O_4$ film were oxidized to form γ-$Fe_2O_3$ film by six kinds of method as follows.

(1) The oxidation was carried out by heating at 280° C. for 4 hours in air as usual method.

(2) External magnetic field (4 KOe) was applied parallel to $Fe_3O_4$ film and thereafter removed. The $Fe_3O_4$ film was kept in a state of residual magnetization in a fixed direction. The oxidation of $Fe_3O_4$ film then was carried out by heating at 280° C. for 4 hr in air to form γ-$Fe_2O_3$ film.

(3) Oxidation was carried out by heating at 215° C. for 4 hours in air to form the film of intermediate state between $Fe_3O_4$ and γ-$Fe_2O_3$. Next, an external magnetic field was applied parallel to the film surface, and removed. The applied magnetic field maintained the film in a state of residual magnetization in the fixed direction of inner film surface. Heat treatment again was carried out by heating at 280° C. for 4 hours in air.

(4) Oxidation $Fe_3O_4$ film was carried out by heating 280° C. for 4 hours in air to form γ-$Fe_2O_3$. Thereafter, an external magnetic field (4 KOe) was applied parallel to the film surface, then removed. The applied magnetic field kept the film in the state of residual magnetization toward the fixed direction of the film surface. The heat treatment again was carried out by heating at 280° C. for 4 hours in air.

(5) Oxidation of $Fe_3O_4$ film was carried out by heating at 280° C. for 10 minutes in air while the external magnetic field (4 KOe) was applied parallel to film surface and thereafter removed. Subequently, the film oxidation was carried out by heating at 280° C. for 4 hours in air (6) Oxidation of $Fe_3O_4$ film was carried out by heating at 280° C. for 4 hours in air while the external magnetic filed (4 KOe) was applied parallel to film surface. The film formed by the heat-treatment (1) was identified as γ-$Fe_2O_3$ phase by means of the electron diffraction. Magnetic characteristics of γ-$Fe_2O_3$ film formed by the above-mentioned six kinds of heat treatment were shown in TABLE 2 as follows:

TABLE 2

| Magnetic Characteristics of $\gamma$-$Fe_2O_3$ film | | | |
|---|---|---|---|
| Method of heat treatment | Magnetic characteristics | | |
| | Hc(Oe) | $\alpha$ | S* |
| 1 | 640 | 2.50 | 0.71 |
| 2 | 660 | 1.59 | 0.97 |
| 3 | 690 | 1.52 | 0.97 |
| 4 | 660 | 1.46 | 0.94 |
| 5 | 670 | 1.52 | 0.97 |
| 6 | 690 | 1.50 | 0.97 |

$\gamma$-$Fe_2O_3$ film formed by method (1) applied the magnetic field for the measurement from an arbitrary direction, $\gamma$-$Fe_2O_3$ film formed by methods (2) to (6) applied the magnetic field for the measurement from fixed direction which was that of applied the magnetic field to the film in the method of heat treatment. $\gamma$-$Fe_2O_3$ films provided by the heat treatment of methods (2) to (6) was confirmed in comparison with the film provide by method (1) to improve Hc, $\alpha$ and S* and to obtain squareness of hysteresis loop.

EXAMPLE 9

$\gamma$-$Fe_2O_3$ film was prepared by reactive sputtering using 98 at. % Fe - 2 at. % Co alloy as the target having 200 mm in diameter under $8\times10^{-3}$ Torr of 50% Ar+50% $O_2$ gas mixture at 1 kW of sputtering power on the Al alloy substrate coated with anoidized layer. Resultant $\alpha$-$Fe_2O_3$ film had 0.14 $\mu$m in thickness and had Os content of 0.83 to 2.13 at. %. Two kinds of $\alpha$-$Fe_2O_3$ film then were reduced in wet $H_2$ gas at 250° C. for 3 hours to form $Fe_3O_4$ film.

External magnetic field (4 KOe) was applied parallel to the surface of the film and thereafter removed. The applied magnetic field to keep a state of residual magnetization. The $Fe_3O_4$ film was heated at 300° C. for 3 hours in air to form $\gamma$-$Fe_2O_3$ film. $Fe_3O_4$ film with no applied external magnetic field also was heated under above-mentioned same condition in comparison. Magnetic characteristics such as Hc, $\alpha$ and S* of $\gamma$-$Fe_2O_3$ film was shown in TABLE 3.

TABLE 3

| Magnetic characteristics of $\gamma$-$Fe_2O_3$ film | | | |
|---|---|---|---|
| Sample | Magnetic characteristics | | |
| | Hc(Oe) | $\alpha$ | S* |
| $\gamma$-$Fe_2O_3$ film added 0.83 at. % Os | | | |
| without magnetic heat treatment | 1100 | 2.00 | 0.75 |
| with magnetic heat treatment | 1200 | 1.50 | 0.95 |
| $\gamma$-$Fe_2O_3$ film added 2.13 at. % Os | | | |
| without magnetic heat treatment | 1800 | 1.50 | 0.82 |
| with magnetic heat treatment | 1960 | 1.34 | 0.94 |

$\gamma$-$Fe_2O_3$ film contained 2 at. % Co herein. $Fe_3O_4$ film kept in a state of residual magnetization was oxidized to form $\gamma$-$Fe_2O_3$ film. The measurement of magnetic properties was carried out at a direction parallel toward the magnetization direction. The samples with magnetic heat treatment in comparison with samples without magnetic heat treatment increased about 10% in Hc and 16 to 26% in S* and decreased 11 to 25% in $\alpha$ and had good squareness of hysteresis loop.

EXAMPLE 10

Figure 7:
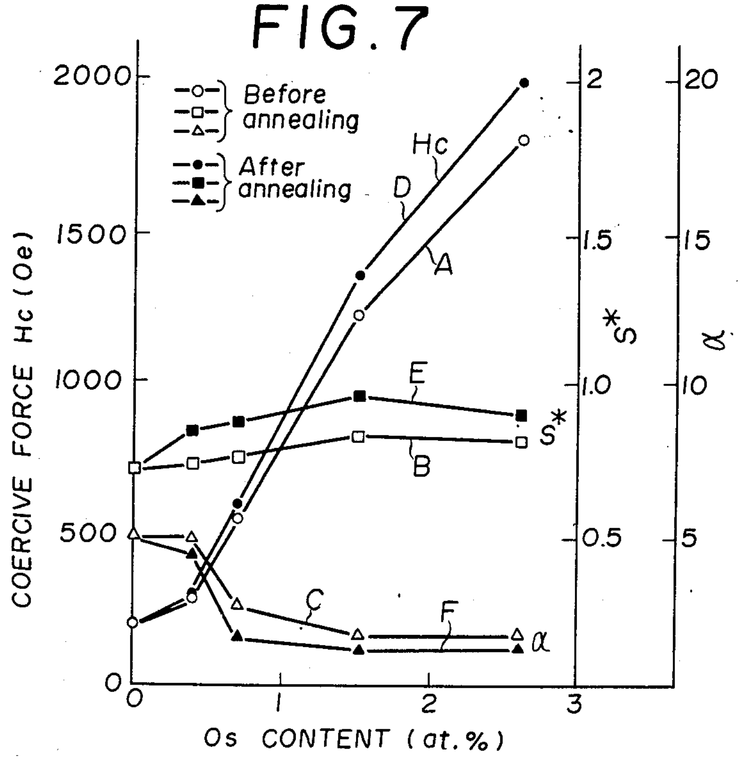
FIG. 7 shows a relation Os content and coercive force, coercive squareness and $\alpha$.

99.9 at. % Fe having 200 mm in diameter and additive Os as target was sputtered by reactive sputtering using radio frequency magnetron method under $8\times10^{-3}$ Torr of 50% Ar+50% $O_2$ gas mixture at 1 kW of sputtering power to form $\alpha$-$Fe_{23}$ film containing Os on Al-alloy substrate. The substrate has been anodized to form $Al_2O_3$ layer on the surface. The substrate 210 mm in diameter, was rotated at 10 r.p.m. during the formation of sputtering film to make uniform distribution of thickness and the target was sputtered for 34 minutes to form $\alpha$-$Fe_2O_3$ film having 0.17 $\mu$m in thickness on the substrate. Os content was controlled by amount of Os powder placed on the target. $\alpha$-$Fe_2O_3$ films contained 0.37, 0.70, 1.5 and 2.6 at. % Os respectively were reduced in wet $H_2$ gas at 250° C. for 3 hours to $Fe_3O_4$ film and thereafter heated at 310° C. for 4 hours in air to form $\gamma$-$Fe_2O_3$ films. Substrates on which were formed $\gamma$-$Fe_2O_4$ film were cut to pieces of 8 mm×8 mm square. External magnetic field (4 KOe) was applied parallel to the surface of a piece of $\gamma$-$Fe_2O_3$ film and thereafter removed. The applied magnetic field maintained the film in a state of residual magnetization and the film has heated at 200° C. for one hour in air (annealing). Relation of Os content and magnetic properties before and after annealing is shown in FIG. 7. After annealing, $\gamma$-$Fe_2O_3$ film showed an increase of Hc and S*, and decrease of $\alpha$. In curves A, B, and C in FIG. 7, $\gamma$-$Fe_2O_3$ film was subjected to oxidation treatment as in the above-mentioned EXAMPLES (before annealing), $\gamma$-$Fe_2O_3$ film shown by curves D, E and F was subjected to oxidation treatment and an external magnetic field was applied to the film. Then annealing was carried out (after annealing).

$\gamma$-$Fe_2O_3$ film with Co, Cu, and Ti added showed S*=0.77, but $\gamma$-$Fe_2O_3$ film with more than 0.37 at. % Os present, the current invention, showed S*=0.84.

EXAMPLE 11

Figure 8:
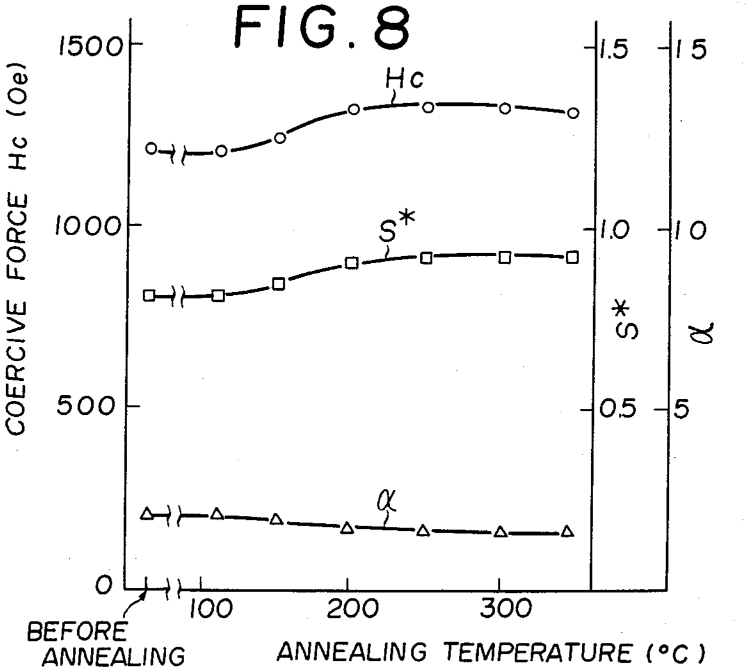
FIG. 8 shows a relation of annealing temperature and magnetic characteristics (Hc, S*, $\alpha$).

$\gamma$-$Fe_2O_3$ film containing 1.4 at. % Os prepared according to the method of EXAMPLE 10 (99.9 at. % Fe target) was reduced in wet $H_2$ gas at 250° C. for 3 hours to form $Fe_3O_4$ film and thereafter the $Fe_3O_4$ films was heated at 310° C. for 4 hours in air to form $\gamma$-$Fe_2O_3$ film. Substrate formed $\gamma$-$Fe_2O_3$ film was separated to cut a piece of 8 mm×8 mm square. External magnetic field (4 KOe) was applied parallel to surface of the $\gamma$-$Fe_2O_3$ film and thereafter removed. The applied magnetic field maintained the film in a state of residual magnetization. The film was heated at 110° to 350° C. for one hour in air. Relation of annealing temperature and magnetic characteristics is shown in FIG. 8. When annealing temperature was carried out above 150° C., magnetic characteristics of resultant $\gamma$-$Fe_2O_3$ film exhibited an increase of Hc and S*, and a decrease of $\alpha$. When annealing temperature was carried out over 250° C., the values of magnetic characteristics became a constant value.

Figure 9:
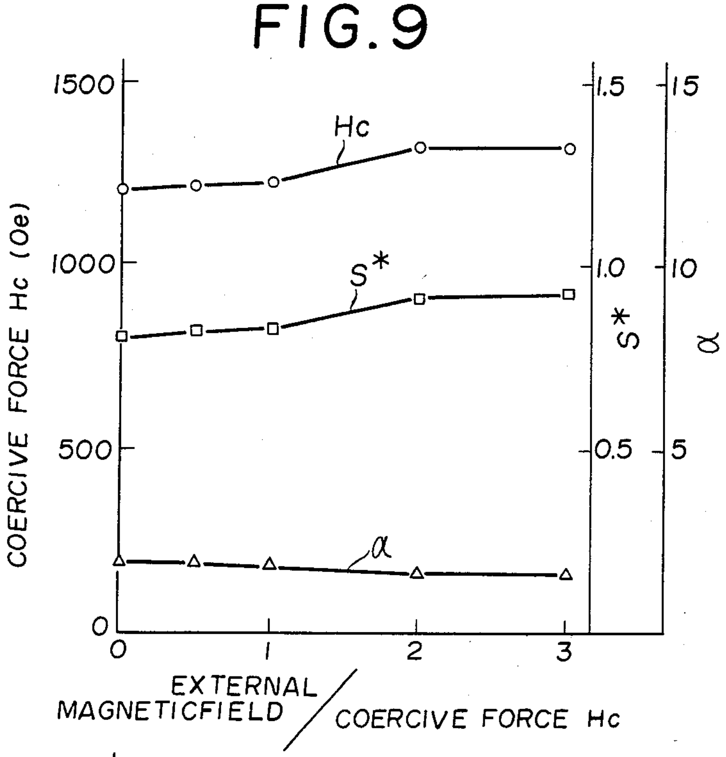
FIG. 9 shows a relation of magnetic annealing field normalized by coercive force and magnetic characteristics (Hc, S*, $\alpha$).

Before annealing, external magnetic fields of varying intensity were applied to $\gamma$-$Fe_2O_3$ film. Annealing was carried out by heating at 250° C. for one hour in air. Relation of external magnetic field applied to the film and magnetic characteristics after annealing is shown in FIG. 9. External magnetic field was shown to normalize by the coercive force (Hc) of $\gamma$-$Fe_2$3 film before annealing. When the value of external magnetic field normalized by Hc exceeded 0.5, coercive squareness of hystersis loop of $\gamma$-$Fe_2O_3$ film medium was improved. When the value exceeded 2, magnetic characteristics such as Hc, S* and $\alpha$ reached a constant value. As shown from EXAMPLES 8 to 11, $\gamma$-$Fe_2O_3$ film with applied the magnetic heat treatment exhibited magnetic anisotropy in the film. This phenomenon, however, could not be detected in $\gamma$-$Fe_2O_3$ film containing Co, Cu and Ti. Surprisingly, only $\gamma$-$Fe_2O_3$ film containing Os exhibited this phenomenon.

This magnetic anisotropy was also caused in films prepared in conditions of sputtering and reducing heat treatment as follows: The composition of sputtering atmosphere had a range from 100% of $O_2$ to 90% Ar+10% $O_2$ under $2\times10^{-3}$ to $5\times10^{-3}$ Torr. Temperature range of reducing heat treatment was 225° to 300° C. for over one hour to form $Fe_3O_4$ and thereafter $Fe_3O_4$ or $\gamma$-$Fe_2O_3$ or intermediate state of $Fe_3O_4$ and $\gamma$-$Fe_2O_3$ was provided by heating in magnetic field or by heating in residual magnetization state. $\gamma$-$Fe_2O_3$ could be film which was given magnetic anisotropy in definite direction.

EXAMPLE 12

$Fe_3O_4$ with 0.88 at. % Os film was prepared by same condition of EXAMPLE 8. To magnetize $Fe_3O_4$ film toward circumferential direction of the disk, a magnetic head of Winchester type was used on the rotating disk and the head moved in the radial direction of the disk while $Fe_3O_4$ film was magnetized by the magnetic field from the head.

The head had 370 $\mu$m in core width, 0.4 $\mu$m in gap length, and 12 times in number of coil turns. When the head was used at 8.5 m/s of relative velocity, the head-medium spacing was 0.18 $\mu$m. Head material used was Mn-Zn ferrite. The disk was magnetized toward circumferential direction over a range from 190 mm to 200 mm in diameter of the disk using the head magnetized by 50 mA D.C. The disk was oxidized at 310° C. for 4 hours in air to form $\gamma$-$Fe_2O_3$ film disk.

Read/write characteristics of this disk was measured by the same head and operating conditions above. Two positions of the disk were measured at 195 mm in diameter applied to magnetize by the head before oxidizing heat treatment and at 160 mm in diameter provided without magnetization in $\gamma$-$Fe_2O_3$ film disk. The measurement results of read/write characteristics was shown in TABLE 4.

TABLE 4

| | Measurement results of read/write characteristics | |
|---|---|---|
| Position of measurement | 195 mm | 160 mm |
| Isolated pulse read back amplitude (mV) | 3.33 | 2.90 |
| Recording density (FRPM) | 1200 | 1088 |
| Over write characteristics (dB) | −37 | −32 |
| Signal to noise ratio (dB) | 48 | 46 |

As shown in TABLE 4, $\gamma$-$Fe_2O_3$ film with magnetic anisotropy to circumferential direction of disk (195 mm in diameter) in comparison with $\gamma$-$Fe_2O_3$ film provided without magnetization (160 mm in diameter) showed improved 112 FRPM (Flux Reversal Per Millimeter) in recording density ($D_{50}$) 0.38 mv in isolated pulse read back amplitude, −5 dB in over write characteristics, and 2.0 dB in signal to noise ratio. An excellent signal to noise ratio was based on the reason that the film was composed of fine crystal grain several hundred angstroms in diameter. When Os was not added, crystal grain grew about 1000 angstroms with reductive heat treatment and oxidative heat treatment, therefore Os additive prevented crystal grain growth.

"Isolated pulse read back amplitude" means amplitude of output pulse at low recording density in the case being uninfluenced by adjoining pulses.

"$D_{50}$" means the recording density where the read back amplitude attenuates to half of the isolated pulse read back amplitude. "Over write characteristics" means that magnetic medium first is recorded at 200 FRPM of pulse, thereafter recorded at 900 FRPM of pulse on the same truck, then shows 900 FRPM component to 200 FRPM component ratio in the frequency spectrum of read back amplitude. "Signal to noise ratio" means that ratio of half voltage of read back pulse amplitude in recording pulse of 1130 FRPM is shown and the effective value of noise voltage calculated as to the noise only caused from medium.

The magnetic characteristics of $\gamma$-$Fe_2O_3$ film −0.17 $\mu$m thick containing 2 at. % Co - 2 at. % Ti - 1.5 at. % Cu had 2500 Gauss of residual magnetization, 2.0 of $\alpha$, 0.78 of S* and 650 Oe of Hc, and the read-write characteristics of the disks were 2.9 mv of isolated pulse read back amplitude, 1020 FRPM of recording density, −30 dB of over write characteristics, and 43 dB of signal to noise ratio. Therefore read/write characteristics of $\gamma$-$Fe_2O_3$ film with Os added according to the present invention showed values over that of $\gamma$-$Fe_2O_3$ film added Co, Ti, and Cu, both before and after annealing.

EXAMPLE 13

$\gamma$-$Fe_2O_3$ film with 1.5 at. % of Os was prepared under the same conditions showed of EXAMPLE 10. This $\alpha$-$Fe_2O_3$ film with Os was reduced in wet $H_2$ gas at 225° C. for 3 hours to form $Fe_3O_4$ film with Os, thereafter the $Fe_3O_4$ film was heated at 310° C. for 4 hours in air to form $\gamma$-$Fe_2O_3$ film with Os. Substrate deposited $\gamma$-$Fe_2O_3$ film was separated to cut a piece 8 mm×8 mm square and an external magnetic field (4 KOe) was applied parallel to the film surface, thereafter removed. The piece was then heated at 200° C. for one hour in air to provide the annealing. Temperature dependence of Hc before and after annealing is shown in FIG. 10, herein G curve showed before annealing of $\gamma$-$Fe_2O_3$ film with 1.5 at. % Os, H curve showed after annealing of $\gamma$-$Fe_2O_3$ film with 1.5 at. % Os, also in comparison with $\gamma$-$Fe_2O_3$ film with 4.8 at. % Co as shown together as curve I in FIG. 10.

$\gamma$-$Fe_2O_3$ film with 4.8 at. % Co was prepared under the same conditions as EXAMPLE 10 except that Co pellet was placed on the iron target and reduction of $\alpha$-$Fe_2O_3$ film was carried out at 300° C. to form $Fe_3O_4$ film.

Figure 10:
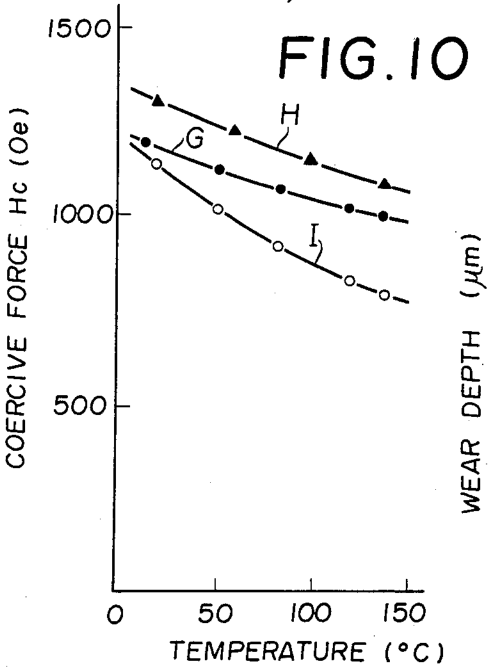
FIG. 10 shows a relation of coercive force of $\gamma$-$Fe_2O_3$ film containing Os or Co and temperature.
Figure 11:
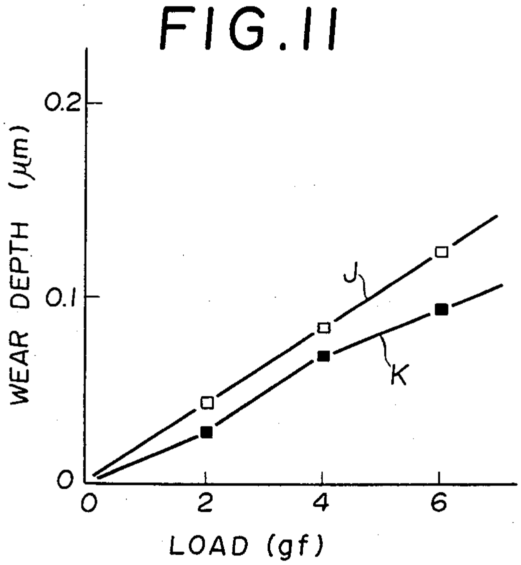
FIG. 11 shows a relation of ferrite ball load and wear depth.

As obvious from FIG. 10, Hc obtained as about same value at room temperature, but regardless of whether the annealing was carried out or not, temperature dependence of Hc of $\gamma$-$Fe_2O_3$ film with Os was less than that of $\gamma$-$Fe_2O_3$ film added Co. Differences in temperature dependence of magnetic characteristics such as S*, and saturation magnetization, except Hc, could not be observed in the above-mentioned three kinds of the film.

Coercive force is a magnetic characteristic that had a large influence upon of the recording density.

It is desirable to decrease temperature dependence of Hc as low as possible for the disk medium in order to decrease thermal demagnetization of the signal by a rise

TABLE 2

Magnetic Characteristics of $\gamma$-$Fe_2O_3$ film

| Method of heat treatment | Magnetic characteristics Hc(Oe) | $\alpha$ | S* |
|---|---|---|---|
| 1 | 640 | 2.50 | 0.71 |
| 2 | 660 | 1.59 | 0.97 |
| 3 | 690 | 1.52 | 0.97 |
| 4 | 660 | 1.46 | 0.94 |
| 5 | 670 | 1.52 | 0.97 |
| 6 | 690 | 1.50 | 0.97 |

$\gamma$-$Fe_2O_3$ film formed by method (1) applied the magnetic field for the measurement from an arbitrary direction, $\gamma$-$Fe_2O_3$ film formed by methods (2) to (6) applied the magnetic field for the measurement from fixed direction which was that of applied the magnetic field to the film in the method of heat treatment. $\gamma$-$Fe_2O_3$ films provided by the heat treatment of methods (2) to (6) was confirmed in comparison with the film provide by method (1) to improve Hc, $\alpha$ and S* and to obtain squareness of hysteresis loop.

EXAMPLE 9

$\gamma$-$Fe_2O_3$ film was prepared by reactive sputtering using 98 at. % Fe - 2 at. % Co alloy as the target having 200 mm in diameter under $8\times10^{-3}$ Torr of 50% Ar+50% $O_2$ gas mixture at 1 kW of sputtering power on the Al alloy substrate coated with anoidized layer. Resultant $\alpha$-$Fe_2O_3$ film had 0.14 $\mu$m in thickness and had Os content of 0.83 to 2.13 at. %. Two kinds of $\alpha$-$Fe_2O_3$ film then were reduced in wet $H_2$ gas at 250° C. for 3 hours to form $Fe_3O_4$ film.

External magnetic field (4 KOe) was applied parallel to the surface of the film and thereafter removed. The applied magnetic field to keep a state of residual magnetization. The $Fe_3O_4$ film was heated at 300° C. for 3 hours in air to form $\gamma$-$Fe_2O_3$ film. $Fe_3O_4$ film with no applied external magnetic field also was heated under above-mentioned same condition in comparison. Magnetic characteristics such as Hc, $\alpha$ and S* of $\gamma$-$Fe_2O_3$ film was shown in TABLE 3.

TABLE 3

Magnetic characteristics of $\gamma$-$Fe_2O_3$ film

| Sample | Magnetic characteristics Hc(Oe) | $\alpha$ | S* |
|---|---|---|---|
| $\gamma$-$Fe_2O_3$ film added 0.83 at. % Os | | | |
| without magnetic heat treatment | 1100 | 2.00 | 0.75 |
| with magnetic heat treatment | 1200 | 1.50 | 0.95 |
| $\gamma$-$Fe_2O_3$ film added 2.13 at. % Os | | | |
| without magnetic heat treatment | 1800 | 1.50 | 0.82 |
| with magnetic heat treatment | 1960 | 1.34 | 0.94 |

$\gamma$-$Fe_2O_3$ film contained 2 at. % Co herein. $Fe_3O_4$ film kept in a state of residual magnetization was oxidized to form $\gamma$-$Fe_2O_3$ film. The measurement of magnetic properties was carried out at a direction parallel toward the magnetization direction. The samples with magnetic heat treatment in comparison with samples without magnetic heat treatment increased about 10% in Hc and 16 to 26% in S* and decreased 11 to 25% in $\alpha$ and had good squareness of hysteresis loop.

EXAMPLE 10

99.9 at. % Fe having 200 mm in diameter and additive Os as target was sputtered by reactive sputtering using radio frequency magnetron method under $8\times10^{-3}$ Torr of 50% Ar+50% $O_2$ gas mixture at 1 kW of sputtering power to form $\alpha$-$Fe_{23}$ film containing Os on Al-alloy substrate. The substrate has been anodized to form $Al_2O_3$ layer on the surface. The substrate 210 mm in diameter, was rotated at 10 r.p.m. during the formation of sputtering film to make uniform distribution of thickness and the target was sputtered for 34 minutes to form $\alpha$-$Fe_2O_3$ film having 0.17 $\mu$m in thickness on the substrate. Os content was controlled by amount of Os powder placed on the target. $\alpha$-$Fe_2O_3$ films contained 0.37, 0.70, 1.5 and 2.6 at. % Os respectively were reduced in wet $H_2$ gas at 250° C. for 3 hours to $Fe_3O_4$ film and thereafter heated at 310° C. for 4 hours in air to form $\gamma$-$Fe_2O_3$ films. Substrates on which were formed $\gamma$-$Fe_2O_4$ film were cut to pieces of 8 mm$\times$8 mm square. External magnetic field (4 KOe) was applied parallel to the surface of a piece of $\gamma$-$Fe_2O_3$ film and thereafter removed. The applied magnetic field maintained the film in a state of residual magnetization and the film has heated at 200° C. for one hour in air (annealing). Relation of Os content and magnetic properties before and after annealing is shown in FIG. 7. After annealing, $\gamma$-$Fe_2O_3$ film showed an increase of Hc and S*, and decrease of $\alpha$. In curves A, B, and C in FIG. 7, $\gamma$-$Fe_2O_3$ film was subjected to oxidation treatment as in the above-mentioned EXAMPLES (before annealing), $\gamma$-$Fe_2O_3$ film shown by curves D, E and F was subjected to oxidation treatment and an external magnetic field was applied to the film. Then annealing was carried out (after annealing).

$\gamma$-$Fe_2O_3$ film with Co, Cu, and Ti added showed S*=0.77, but $\gamma$-$Fe_2O_3$ film with more than 0.37 at. % Os present, the current invention, showed S*=0.84.

EXAMPLE 11

$\gamma$-$Fe_2O_3$ film containing 1.4 at. % Os prepared according to the method of EXAMPLE 10 (99.9 at. % Fe target) was reduced in wet $H_2$ gas at 250° C. for 3 hours to form $Fe_3O_4$ film and thereafter the $Fe_3O_4$ films was heated at 310° C. for 4 hours in air to form $\gamma$-$Fe_2O_3$ film. Substrate formed $\gamma$-$Fe_2O_3$ film was separated to cut a piece of 8 mm$\times$8 mm square. External magnetic field (4 KOe) was applied parallel to surface of the $\gamma$-$Fe_2O_3$ film and thereafter removed. The applied magnetic field maintained the film in a state of residual magnetization. The film was heated at 110° to 350° C. for one hour in air. Relation of annealing temperature and magnetic characteristics is shown in FIG. 8. When annealing temperature was carried out above 150° C., magnetic characteristics of resultant $\gamma$-$Fe_2O_3$ film exhibited an increase of Hc and S*, and a decrease of $\alpha$. When annealing temperature was carried out over 250° C., the values of magnetic characteristics became a constant value.

Before annealing, external magnetic fields of varying intensity were applied to $\gamma$-$Fe_2O_3$ film. Annealing was carried out by heating at 250° C. for one hour in air. Relation of external magnetic field applied to the film and magnetic characteristics after annealing is shown in FIG. 9. External magnetic field was shown to normalize by the coercive force (Hc) of $\gamma$-$Fe_2$3 film before annealing. When the value of external magnetic field normalized by Hc exceeded 0.5, coercive squareness of hyster-